Figure 1:
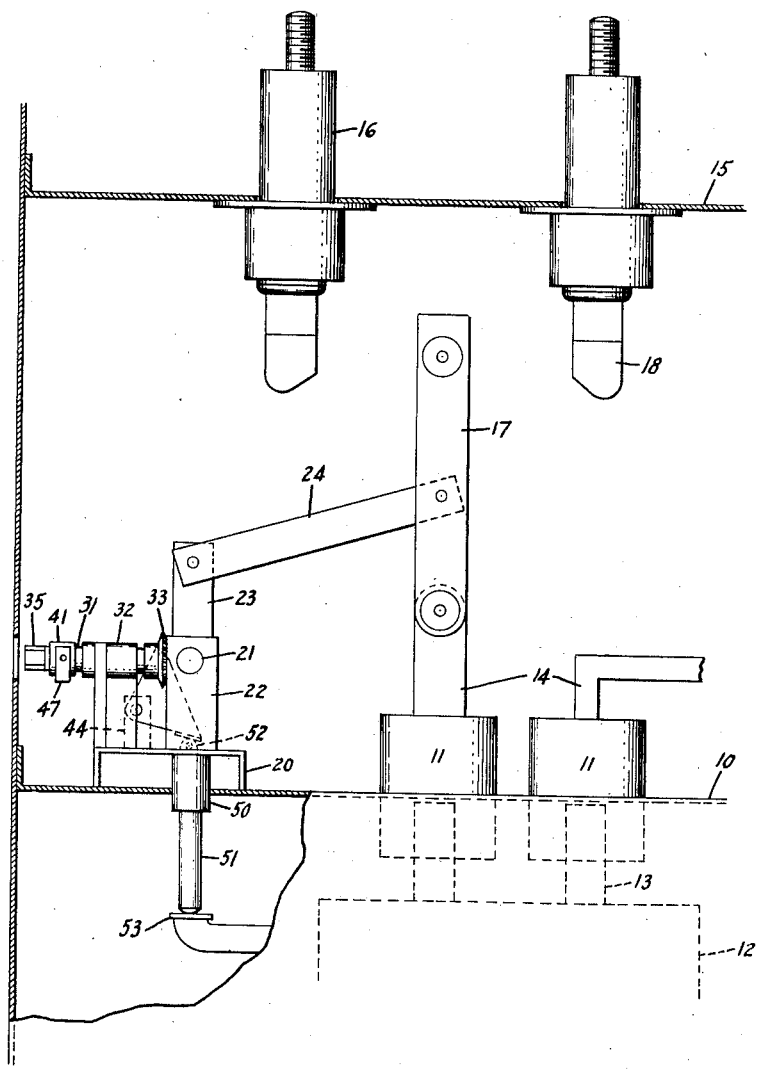

Nov. 23, 1943.   B. I. BURGESS   2,335,042
ELECTRIC SWITCHGEAR
Filed Oct. 1, 1942   3 Sheets-Sheet 1

Inventor:
Bert I. Burgess,
by Harry E. Dunham
His Attorney.

Nov. 23, 1943.  B. I. BURGESS  2,335,042
ELECTRIC SWITCHGEAR
Filed Oct. 1, 1942  3 Sheets-Sheet 2

Inventor:
Bert I. Burgess,
by Harry E. Dunham
His Attorney.

Nov. 23, 1943.   B. I. BURGESS   2,335,042
ELECTRIC SWITCHGEAR
Filed Oct. 1, 1942   3 Sheets-Sheet 3
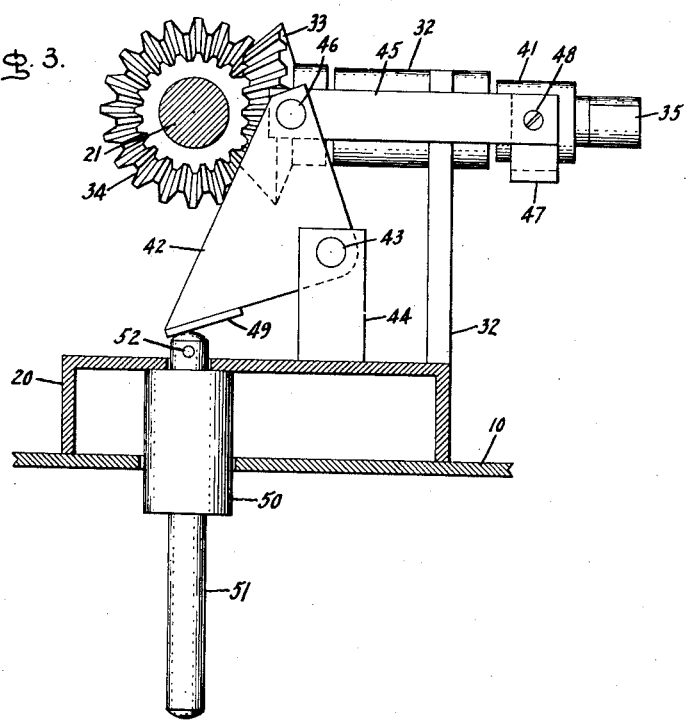
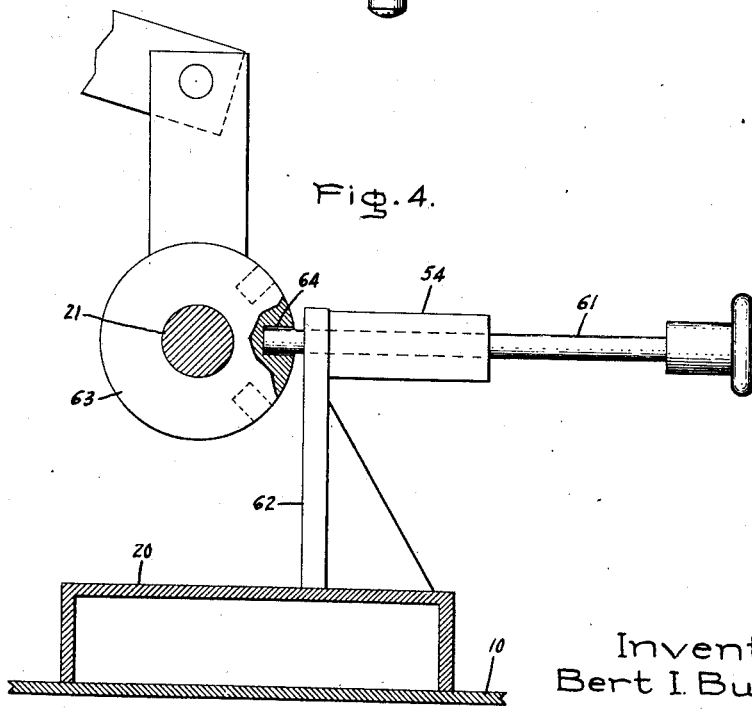
Inventor:
Bert I. Burgess.
by Harry E. Dunham
His Attorney.

Patented Nov. 23, 1943

2,335,042

UNITED STATES PATENT OFFICE 2,335,042

ELECTRIC SWITCHGEAR

Bert I. Burgess, Peterborough, Ontario, Canada, assignor to General Electric Company, a corporation of New York

Application October 1, 1942, Serial No. 460,393
In Canada April 21, 1942

7 Claims. (Cl. 200—50)

My invention relates to electric switchgear and particularly to operating and interlocking mechanism therefor.

In the control of electric power circuits of large current capacity it is customary to provide a circuit breaker of high current interrupting capacity such as an oil circuit breaker between the source of energy and the load and also to provide a disconnecting switch between the source of energy and the circuit breakers whereby the circuit breaker can be isolated from the source and rendered safe for inspection and repair. It is also known to provide a pair of independent supply busses and to arrange the disconnecting switch as a transfer switch whereby the load can be selectively connected through the circuit breaker to either bus. Since the disconnecting and transfer switch is not designed to meet the requirements of making or breaking the power circuit under load, it is customary to provide interlocking means between it and the circuit breaker mechanism whereby its operation from one position to another depends on the circuit breaker being in open circuit position. In mechanisms where the handle or lever by which force is applied to actuate the disconnect and transfer switch is permanently connected thereto, the construction of the parts must be sufficiently rugged to withstand the application of large forces mistakenly applied in an attempt to operate the switch when the circuit breaker is closed.

A principal object of my invention is the provision of an electric switchgear operating mechanism and interlock which is simple and rugged in construction, reliable in operation and which cannot be improperly operated to attempt closing of the disconnect switch under improper conditions.

In accordance with my invention the operating means for the disconnecting and transfer switch is provided with a detachable handle and with mechanism actuated in accordance with operation of the circuit breaker mechanism whereby the handle cannot be applied when the circuit breaker is closed.

My invention will be more fully set forth in the following description referring to the accompanying drawings, and the features of novelty which characterize my invention will be pointed out with particularity in the claims annexed to and forming a part of this specification.

Figure 2:
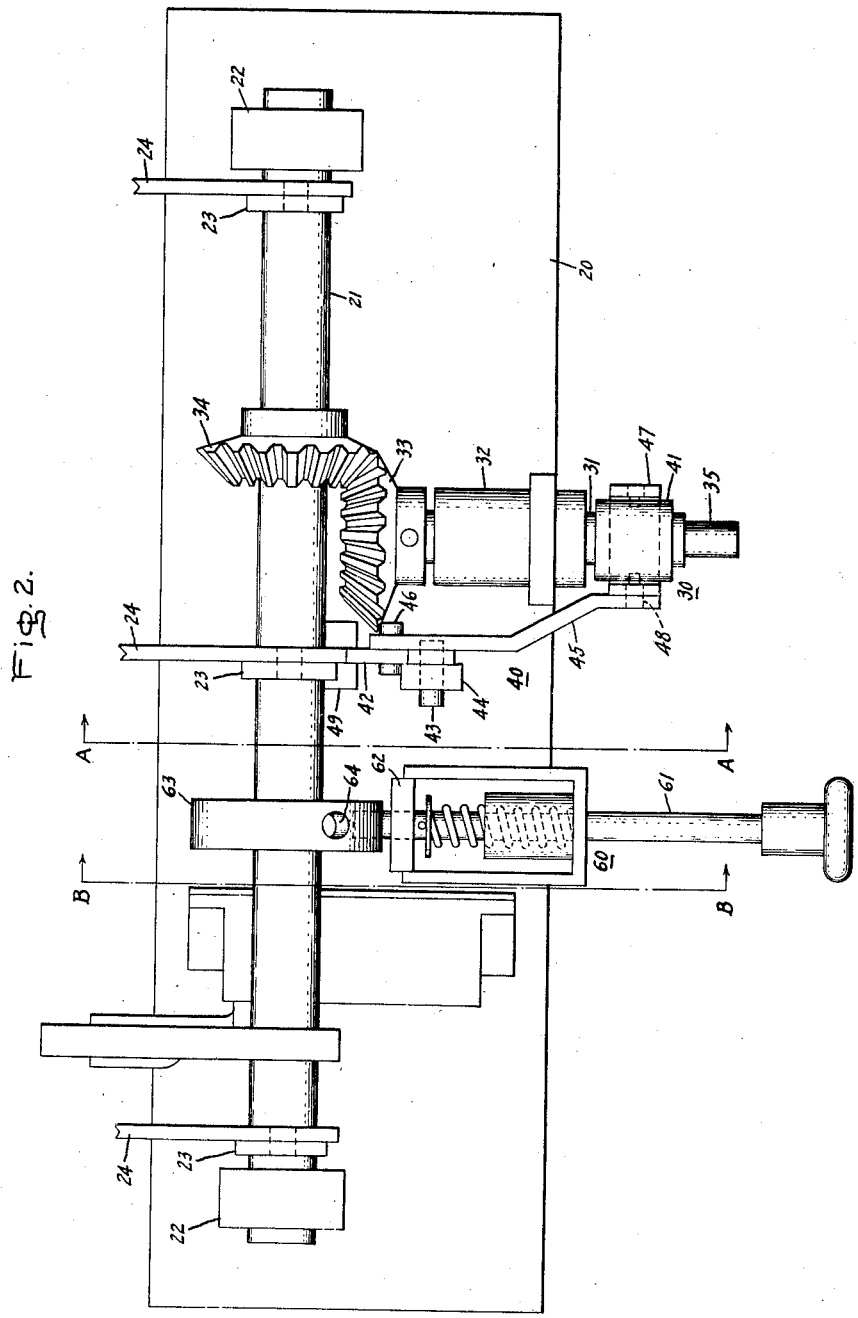

Referring to the drawings, Fig. 1 is an elevational view, partly in section, of switchgear structure in the disconnected position showing the parts necessary for an understanding of my invention; Fig. 2 is a plan view of the operating unit for the disconnecting and transfer switch drawn to a larger scale than Fig. 1; Fig. 3 is a view taken on the line A—A of Fig. 2 looking in the direction of the arrows and Fig. 4 is a view on the line B—B of Fig. 2 looking in the direction of the arrows.

Referring to Fig. 1, reference character 10 indicates part of a metal supporting frame and housing in which a circuit breaker and associated apparatus including a disconnecting and transfer switch are supported. Mounted in the horizontally extending plate 10 are a plurality of insulating bushings 11. The bushings 11 have contacts in the interior thereof whereby an oil circuit breaker 12 indicated in dotted lines in Fig. 1 may be raised so that its conductor studs 13 will make contact within the insulating bushings 11. Conductors 14 extend above the bushings 11 and lead from the contacts therein.

The circuit breaker 12 may be an oil circuit breaker adapted to make and break a heavy load circuit and as the particular form of circuit breaker per se forms no part of my invention, it is not shown in detail. It is sufficient to state that operating mechanism associated therewith completes in a well-known manner a circuit within the tank interconnecting the projecting breaker studs 13, and that the operating mechanism has a movable part fragmentally shown at 53 in Fig. 1.

Supported above the conductors 14 in another horizontally extending plate 15 forming a part of the metal housing are a plurality of insulated conductor studs 16, the upper ends of which are adapted to be connected to supply busses (not shown). The lower ends of the conductor studs 16 terminate in contacts 18. Hinged to the conductor 14 as shown in Fig. 1 is a switchblade 17 positioned and arranged so that its free end may be moved into contact with either contact 18.

Operating mechanism is provided accessible for operation outside the housing whereby the switch blade 17 may be selectively placed in the disconnected or isolating position indicated in Fig. 1 or in contact with either of the contacts 18. The operating means is provided with an interlock with the operating means for circuit breaker 12 whereby operating of the switchblade 17 from one position to another is prevented when the circuit breaker is closed. The operating mechanism for the switchblade 17 is mounted at the unit on a channel 20 and the unit is secured in position on the framework 10. The unit comprises a shaft 21 journalled for rotation in bearing blocks 22 on the channel 20. The shaft as best shown in Fig. 2 has three arms 23 for 3-phase equipment projecting therefrom and each arm is connected by a link 24 as shown in Fig. 1 to a corresponding switchblade 17. Mounted on the base 20 is a mechanism generally indicated at 30 (Fig. 2) whereby the shaft 21 may be rotated, an interlock mechanism generally indicated at 40 whereby operation of the mechanism 30 is prevented under certain conditions, and an indexing latch device generally indicated at 60 whereby the blade 17 is latched in either its isolating or its bus-connecting position.

The operating mechanism 30 is mounted for rotation in a bearing support 32 secured to the channel 20. The shaft 31 extends at right angles to the shaft 21 and has secured to its inner end a beveled gear 33 meshing with a beveled gear 34 secured to the shaft 21. The other shaft end 35 has a non-circular configuration whereby a removable handle with a recess of the same shape to fit thereon may be applied. It is apparent that rotation of the shaft 31 by the handle will rotate the shaft 21 and move the switchblades 17.

The interlock mechanism generally indicated at 40 comprises a sleeve 41 mounted on the shaft 31 and movable therealong from the position shown in Fig. 2 where the handle receiving end 35 is unobstructed, outwardly to a position where the non-circular end is covered, in which position the operating handle cannot be applied. To move the sleeve 41 between its obstructing and unobstructing position the following mechanism is provided. Reference is now made to Fig. 3. A crank 42 is pivoted at 43 on a bracket 44 secured to the channel 20 and a link 45 is pivotally connected at 46 to one arm of the crank 42 and carries at its other end a U-shaped strap 47. This strap partially surrounds the sleeve 41 and is connected thereto by pins or trunnion members 48. The other arm of the crank 42 carries a bearing pad 49. Secured to the base 20 and extending therethrough is a sleeve 50 providing a bearing for the longitudinal vertical movement of a rod 51, the upper end of which is in contact with the bearing pad 49. The rod 51 is provided with a stop 52. The lower end of the rod 51 is in position to be engaged by a movable part 53 of the operating mechanism for the circuit breaker.

The circuit breaker and its operating mechanism are not illustrated in detail as these specific details are immaterial to my invention. It is sufficient to state that the part 53 is in the position illustrated in Fig .1 when the circuit breaker is open and that it is raised to a higher position when the circuit breaker is closed. It will be seen that in the open circuit position illustrated, the end of the shaft 35 is not blocked by the sleeve 41 and a crank may be applied thereto and the switchblades 17 moved to another position as previously described. If, however, the circuit breaker is closed, the rod 51 is moved upwardly rotating the crank 42 about its pivot 43. The link 45 moves the sleeve 41 outwardly along the shaft whereby the crank engaging end 35 is covered. It will be apparent that if the crank is in position when closing of the circuit breaker takes place the mechanism above described would cause the sleeve 41 to push the crank off. It will also be apparent that when the circuit breaker contacts are moved to open circuit position the rod 51 is unobstructed by the pad 53 and the sleeve 41 may be pushed back by the crank handle and the end 35 engaged thereby for operation.

The selective latching mechanism generally indicated at 60 is best seen in Fig. 4. A plunger 61, supported in a bracket 62 on the base 20 is spring pressed into engagement with a collar 63 secured on the shaft 21. The collar 63 is provided with recesses 64 to receive the end of the latch plunger 61 whereby the shaft 21 and consequently the switchblades 17 are latched in one of their selected positions. To operate the switchblade 17 by means of the handle engaging the shaft 35 it is necessary to pull the plunger 61 from engagement with the collar 63 and hold it in this position during the initial movement of the crank.

I have devised a simple and reliable operating mechanism which can be designed with the parts proportioned to withstand forces normally to be expected in operation. As the manually actuated means by which force is applied to operate the disconnect and transfer switch is disconnected when conditions are such that operation should not take place, the proportions of the parts do not have to be made of sufficient strength to withstand the application of an inordinate force applied to the mechanism in an attempt to force it closed under improper conditions.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. Electric switchgear comprising an electric circuit breaker adapted to make and break a power circuit, a switch arranged to be connected in a circuit related to said breaker, operating means for said switch arranged to move it to and from circuit completing position, said operating means having a part constructed to receive an actuating handle, and an interlocking mechanism including means arranged to move from an unobstructing position to a position obstructing the application of the handle to the handle-receiving part, said interlocking mechanism constructed and arranged for actuation by the circuit breaker mechanism so that said handle receiving part is obstructed, when the circuit breaker is in closed position.

2. Electric switchgear comprising an electric circuit breaker adapted to make and break a circuit under load, a switch arranged to be connected in a circuit related to said breaker, operating mechanism for said switch comprising a shaft having an actuating handle-receiving portion, a member movable over said handle-receiving portion, and interlocking mechanism between said member and the circuit breaker mechanism constructed and arranged so that said member is moved to a position obstructing said handle-receiving portion when the circuit breaker is closed.

3. Electric switchgear comprising an electric circuit breaker adapted to make and break a circuit under load, a switch arranged to be connected in a circuit related to said breaker, operating mechanism for said switch comprising a shaft having an actuating handle-receiving portion, a member slidable on said shaft to a position where it overlies or obstructs the handle-receiving end portion and prevents the connection of a handle thereto, and mechanism interconnecting said member and the circuit breaker mechanism constructed and arranged so that said member is moved along the shaft to its obstructing position when the circuit breaker is in closed position.

4. Electric switchgear comprising a power circuit breaker, a disconnecting switch operating means for said switch comprising a rotatable shaft having an actuating handle-receiving end, a sleeve-like member slidable on said shaft to a position where it overlies said handle-receiving end thereby preventing application of an operating handle thereto, and interlocking means interconnecting said sleeve-like member and said circuit breaker for causing movement of said member to said overlying position when said circuit breaker is closed.

5. Electrical switchgear comprising a power circuit breaker, a pivotally mounted switch blade, operating mechanism for said blade including a shaft connected by a link to said blade so that rotation of said shaft moves the blade to circuit controlling positions, a second shaft connected to said first shaft and having an end projecting to an accessible position and formed to be engaged by and have rotary motion imparted thereto by a handle, means mounted for movement from an unobstructing position to a position where it obstructs the application of the handle to the shaft and mechanism connecting said last-named means and a movable part of said circuit breaker mechanism constructed and arranged so that when the circuit breaker is in closed position the handle-receiving part of the operating shaft is obstructed by the first-named means.

6. Electrical switchgear comprising a power circuit breaker, a pivotally mounted disconnecting switch blade, operating mechanism for said blade including a shaft operatively connected to said blade so that rotation of the shaft moves the blade to circuit controlling positions, a manually retractable spring pressed latch co-operating with detents on said shaft to latch the blade in the open and closed positions thereof, means for rotating the shaft comprising a second shaft connected thereto and having an end projecting to an accessible position adjacent to said latch, and means cooperating with the end of said second shaft and interconnected with the circuit breaker mechanism to obstruct the application of an actuating handle to said second shaft when the circuit breaker is in closed position.

7. Electrical switchgear comprising a disconnecting switch and a power circuit breaker with its operating mechanism mounted on a framework, an interlocking unit for said breaker and switch mounted on the framework, said unit comprising mechanism having a part extending to an accessible position and constructed to have a detachable actuating handle applied thereto, and means having a part movable to obstruct the attachment of said handle, said means constructed and arranged so that when the circuit breaker is moved to closed position said part is positively moved to a position preventing the attachment of said actuating handle, said part being held in said obstructing position as long as said circuit breaker remains closed.

BERT I. BURGESS.